(12) United States Patent
Deshpande (10) Patent No.: US 12,459,440 B2
(45) Date of Patent: Nov. 4, 2025

(54) CARGO AREA ACCESSORY STRUCTURE

(71) Applicant: NISSAN NORTH AMERICA, INC., Franklin, TN (US)

(72) Inventor: Neelamkumar Deshpande, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 176 days.

(21) Appl. No.: 18/326,954

(22) Filed: May 31, 2023

(65) Prior Publication Data
US 2024/0399967 A1    Dec. 5, 2024

(51) Int. Cl.
*B60R 9/02* (2006.01)
*B60R 9/06* (2006.01)
*B60R 11/06* (2006.01)
*B60R 11/00* (2006.01)

(52) U.S. Cl.
CPC .................. *B60R 9/02* (2013.01); *B60R 9/06* (2013.01); *B60R 2011/0084* (2013.01); *B60R 11/06* (2013.01)

(58) Field of Classification Search
CPC .. B60R 9/02; B60R 9/06; B60R 11/06; B60R 2011/0084
USPC ......................................... 224/403, 404, 519
See application file for complete search history.

(56) References Cited

U.S. PATENT DOCUMENTS

| | | | |
|---|---|---|---|
| 4,828,312 A | 5/1989 | Kinkel et al. | |
| 6,264,083 B1 * | 7/2001 | Pavlick | B60R 9/00 224/404 |
| 6,431,634 B1 | 8/2002 | Ananian | |
| 6,471,282 B2 | 10/2002 | Hanning | |
| 6,547,478 B1 * | 4/2003 | Lin | A47B 96/068 403/339 |
| 7,494,032 B2 * | 2/2009 | Lussier | B60P 3/14 224/404 |
| 8,567,650 B2 * | 10/2013 | Read | B60R 9/065 224/543 |
| 10,464,466 B2 | 11/2019 | Line et al. | |

(Continued)

FOREIGN PATENT DOCUMENTS

CN    209290268 U    8/2019

OTHER PUBLICATIONS

2005 Nissan Titan Utili-Track Sliding Floor Tray, http://nissanpartspeople.com/product/Titan/2005/Titan%20Load%20Carrying/Utili-Track%20Sliding%20Floor%20Tray, Jun. 2025

(Continued)

*Primary Examiner* — Justin M Larson
(74) *Attorney, Agent, or Firm* — Global IP Counselors, LLP (57) ABSTRACT

A cargo area accessory structure includes a basket having a frame structure dimensioned to fit between side walls of a cargo area structure and a bracket. The bracket has a first horizontal portion that is flat, a vertical portion and a second horizontal portion, The first horizontal portion is dimensioned to rest atop a portion of a utility track. The vertical portion has a first upright portion, a second upright portion and a central vertical rib between the first and second upright portions. The central vertical rib is horizontally offset from first and second upright sides of the vertical portion. The vertical portion attaches to the utility track. The second horizontal portion is attached to and support one lateral side of the basket.

20 Claims, 10 Drawing Sheets

(56) References Cited

U.S. PATENT DOCUMENTS

| | | |
|---|---|---|
| 10,870,397 B2 | 12/2020 | Pokriefka et al. |
| 11,267,406 B2 * | 3/2022 | Deighton ................. B60P 7/10 |
| 11,891,124 B2 * | 2/2024 | Kiefer, IV ............... B60R 9/08 |
| 2005/0017038 A1 * | 1/2005 | Johnson ................ B60R 11/06 |
| | | 224/558 |
| 2008/0219795 A1 | 9/2008 | Anderson et al. |
| 2019/0077294 A1 | 3/2019 | Line et al. |
| 2024/0399967 A1 * | 12/2024 | Deshpande .............. B60R 9/02 |

OTHER PUBLICATIONS

Utili-track Overhead Rack, https://www.titantalk.com/threads/utili-track-overhead-rack.133724/, Aug. 4, 2011.

OEM Nissan Frontier Sliding Tool Box, https://www.z1offroad.com/genuine-accessories/nissan/oem-nissan-frontier-sliding-tool-box-p-18373.html, Jun. 2025.

Titan Tool Box fits in Utili-Track—Denver, https://www.titantalk.com/threads/titan-tool-box-fits-in-utili-track-denver.145971/, May 23, 2012.

* cited by examiner

CARGO AREA ACCESSORY STRUCTURE

BACKGROUND

Technical Field

The present disclosure generally relates to a cargo area accessory structure. More specifically, the present disclosure relates to cargo area accessory structure that includes a basket attached to side walls of a cargo area structure via brackets.

Background Information

There are many accessories made for use within cargo areas of pickup trucks.

SUMMARY

One object of the present disclosure is to provide a cargo area with a versatile accessory that can be used in several different ways within the cargo area and outside the cargo area.

In view of the state of the known technology, one aspect of the present disclosure is to provide a cargo area accessory structure with a basket and a bracket. The basket has a frame structure dimensioned to fit between side walls of a cargo area structure. The bracket has a first horizontal portion, a vertical portion and a second horizontal portion. The first horizontal portion includes a flat portion dimensioned to rest atop a portion of one of the side walls of the cargo area structure. The vertical portion has a first upright portion, a second upright portion and a central vertical rib between the first and second upright portions. The central vertical rib is horizontally offset from first and second upright sides of the vertical portion. The vertical portion further includes attachment structures dimensioned and shaped to attach to the one of the side walls of the cargo area structure. The second horizontal portion has a basket attachment dimensioned and shaped to support one lateral side of the basket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
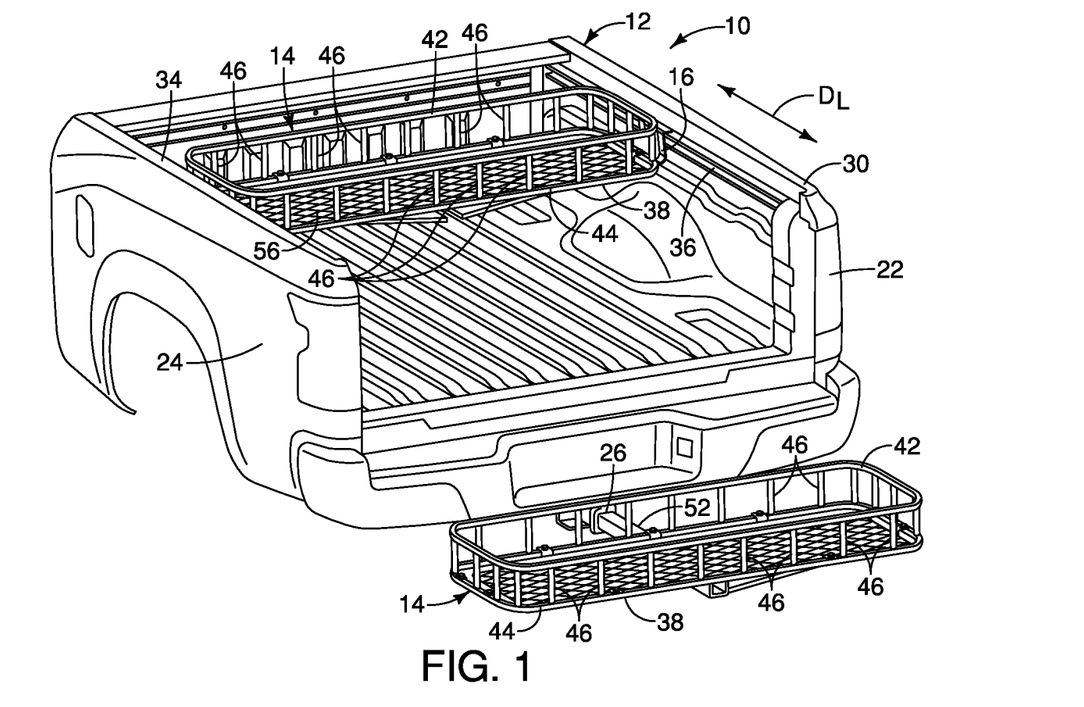
FIG. 1 is a perspective view of a cargo area accessory structure that includes portions of a cargo area structure, a basket and a bracket in accordance with a first embodiment.
Figure 2:
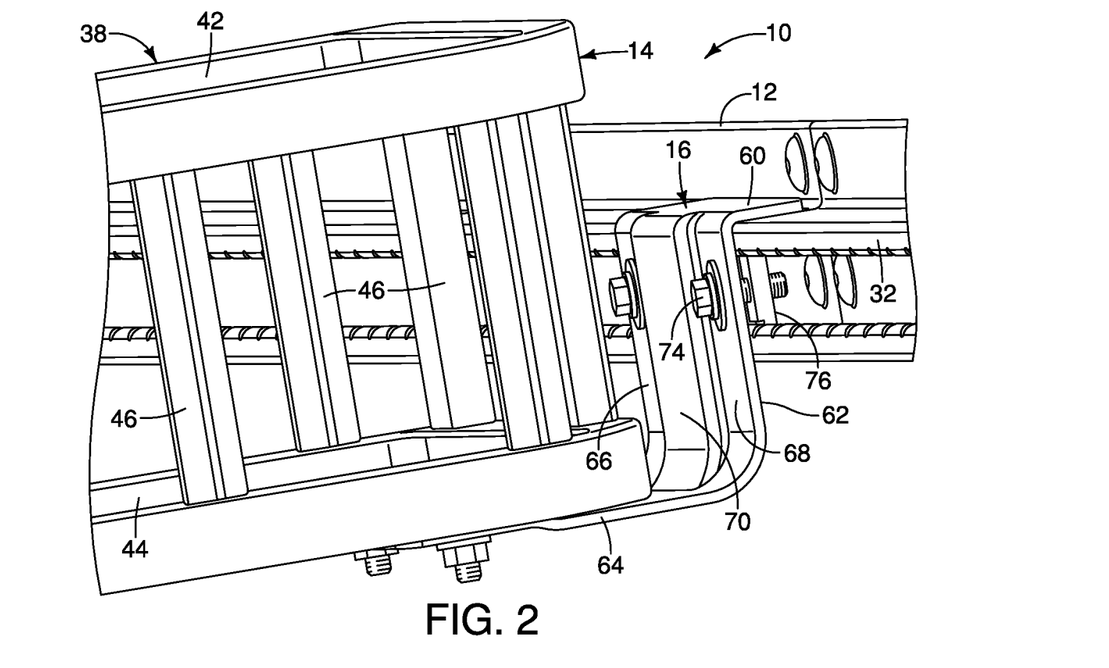
FIG. 2 is a perspective view of a side wall of a cargo area structure showing a utility track with the bracket attached to the utility track of the side wall and the bracket further being attached to the basket in accordance with the first embodiment.
Figure 3:
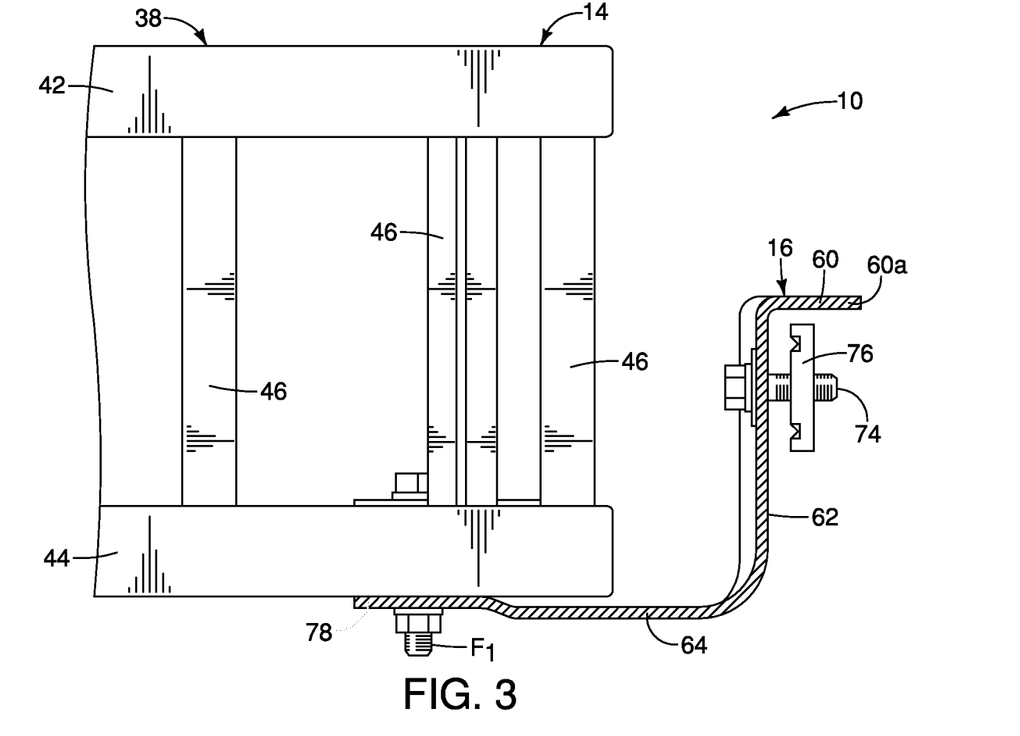
FIG. 3 is a side view of the basket with the bracket attached thereto both removed from utility track of the side wall and further showing utility track attachment structures in accordance with the first embodiment.
Figure 4:
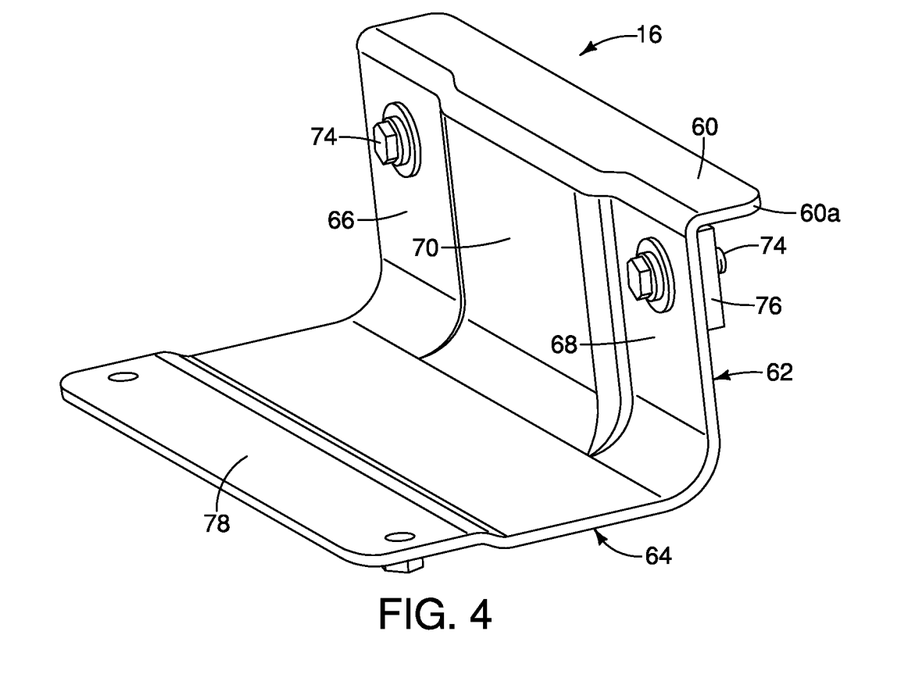
FIG. 4 is a first perspective view of the bracket removed from the basket showing inboard surfaces with the attachment structures installed to a vertical portion of the bracket in accordance with the first embodiment.
Figure 5:
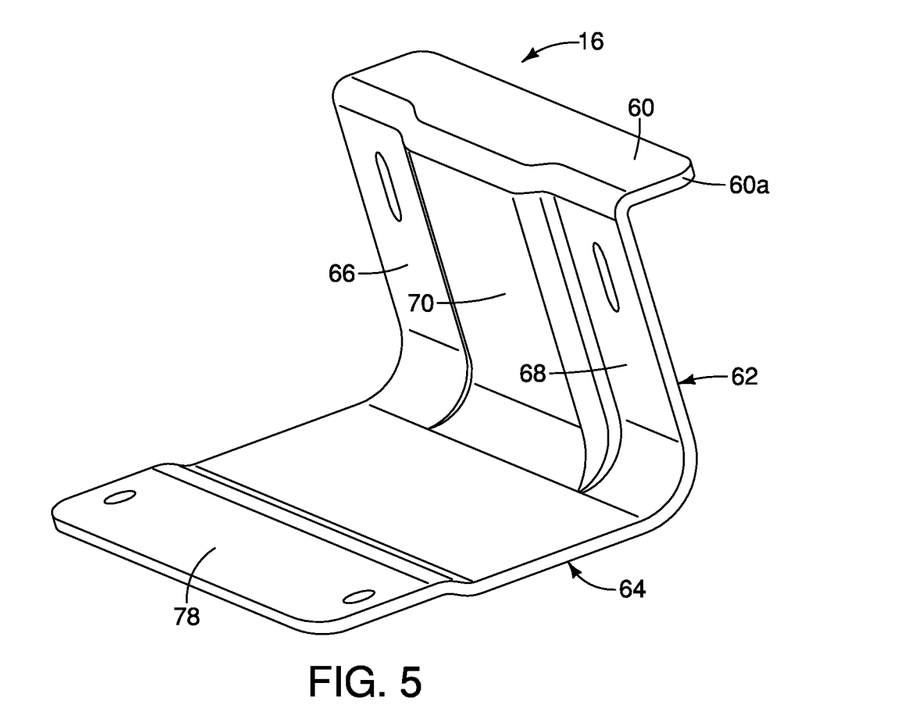
FIG. 5 is a second perspective view of the bracket removed from the basket showing an underside of the bracket with the attachment structures removed in accordance with the first embodiment.
Figure 6:
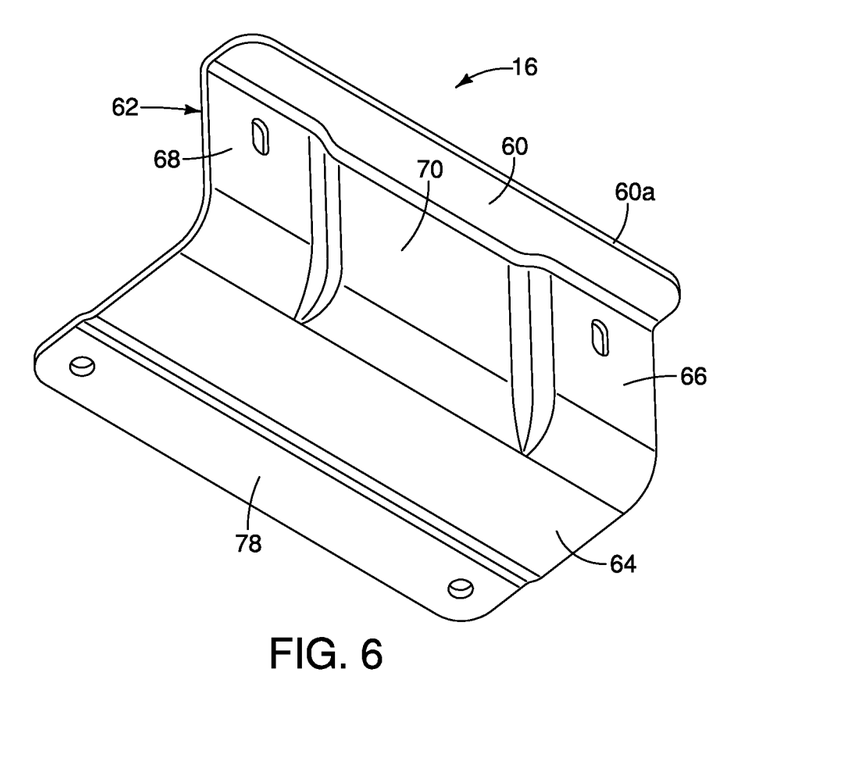
FIG. 6 is a third perspective view of the bracket removed from the basket showing inboard surfaces in accordance with the first embodiment.
Figure 7:
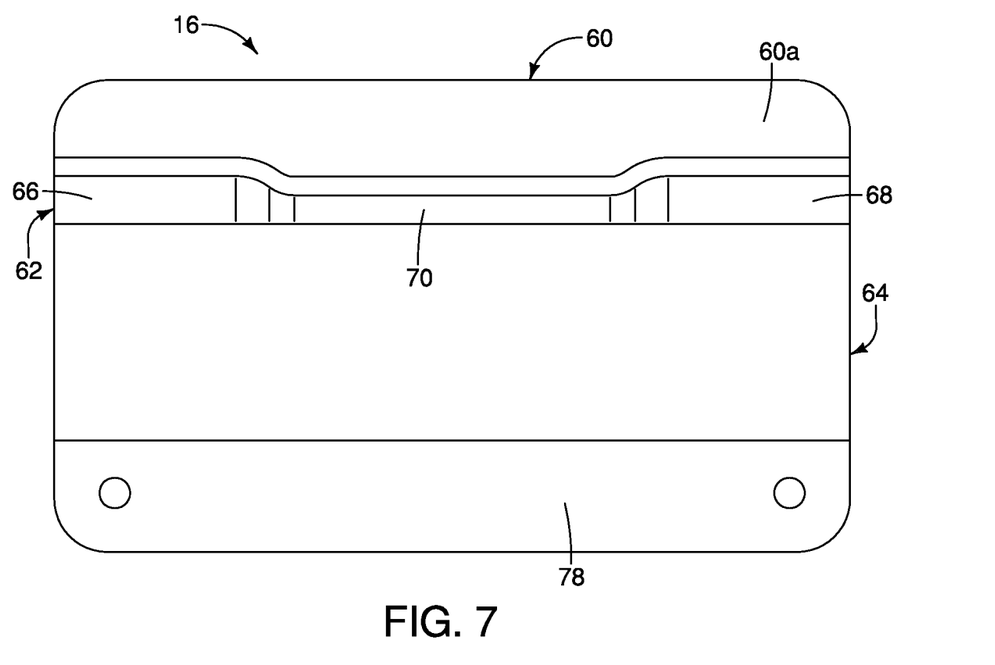
FIG. 7 is a top view of the bracket in accordance with the first embodiment.
Figure 8:
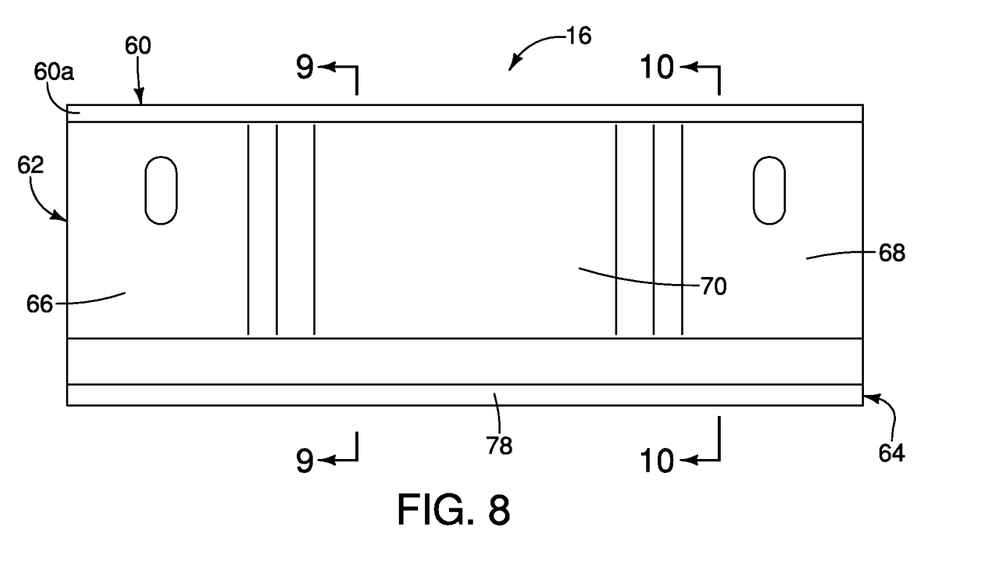
FIG. 8 is a side view of the bracket looking at inboard surfaces thereof in accordance with the first embodiment.
Figure 9:
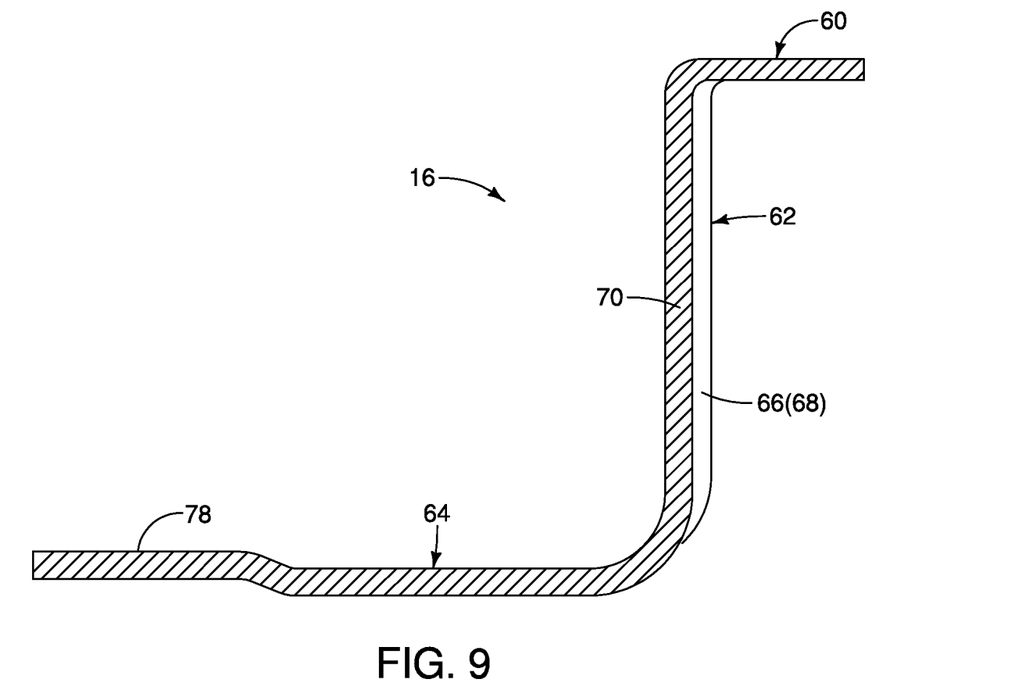
FIG. 9 is a rear cross-sectional view of the bracket taken along the line 9-9 in FIG. 8 in accordance with the first embodiment.
Figure 10:
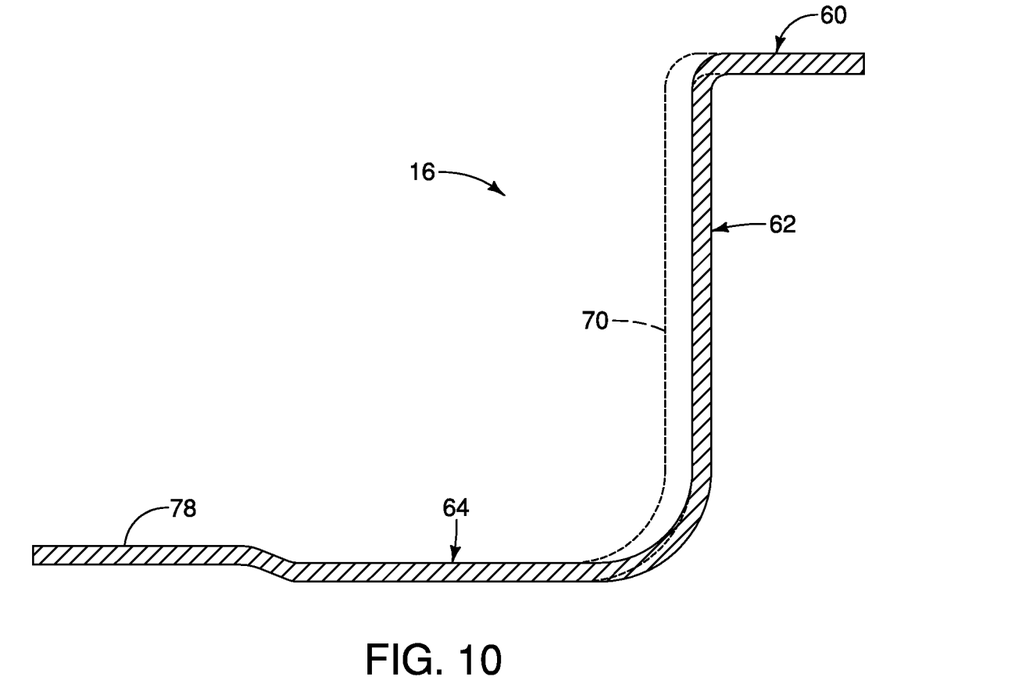
FIG. 10 is another rear cross-sectional view of the bracket taken along the line 10-10 in FIG. 8 in accordance with the first embodiment.
Figure 11:
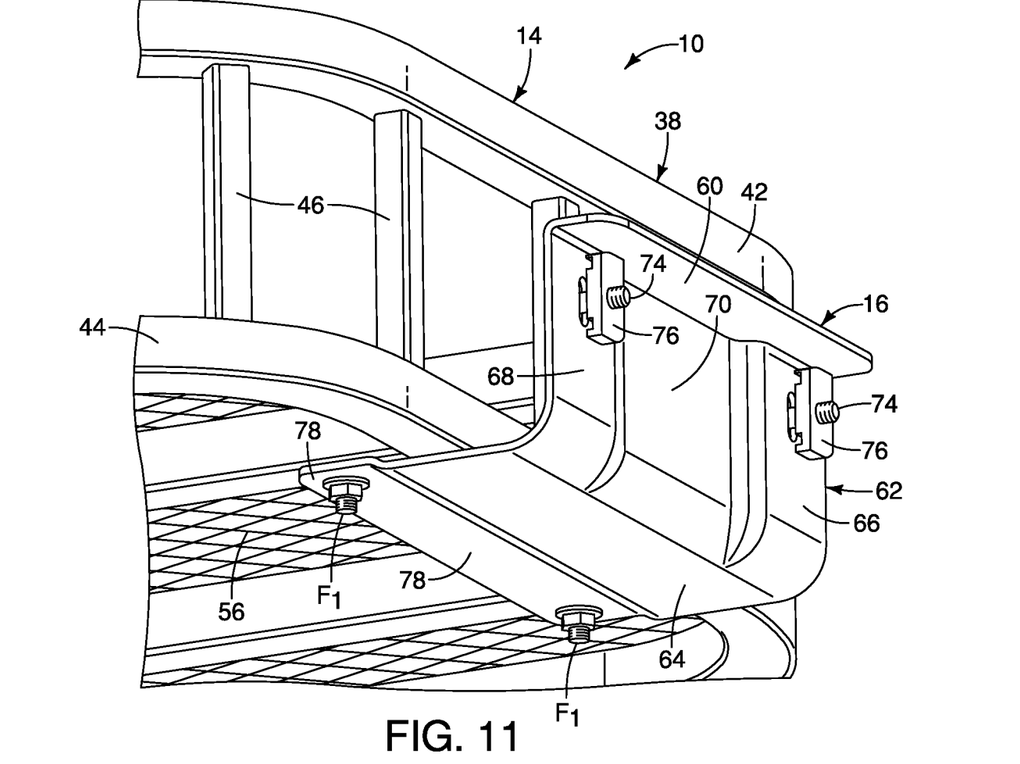
FIG. 11 is a perspective of the basket and bracket showing the bracket attached to an underside of the basket and showing the utility track attachment structures on the vertical portion of the bracket in accordance with the first embodiment.

Referring initially to FIG. 1, a cargo area accessory structure 10 is illustrated in accordance with a first embodiment.

The cargo area accessory structure 10 is installed to a cargo area structure 12 and includes a basket 14 and brackets 16.

The cargo area structure 12 (also referred to as a vehicle cargo area structure 12) is preferably installed to a rear frame of a pickup truck and defines a cargo area 20. The cargo area structure 12 includes first side wall 22 and a second side wall 24. The cargo area structure 20 can optionally include a trailer hitch 26 fixed to an underside of the cargo area structure 20 and the vehicle in a conventional manner. The first and second side walls 22 and 24 are opposing walls in that they are located on opposite lateral sides of the cargo area structure 20 with the cargo area 20 defined therebetween.

The first side wall 22 has an upper surface 30 and a utility track 36. The upper surface 30 extends in a vehicle longitudinal direction $D_L$ relative to the cargo area structure 12. The utility track 36 is installed to an inboard surface of the first side wall 22. The utility track 36 is a conventional structure as described in, for example, US Patent Application Publication No. 2008/0219795. US Patent Application Publication No. 2008/0219795 is incorporated herein by reference in its entirety.

The second side wall 24 has an upper surface 34 and another utility track 36. The upper surface 34 extends in the vehicle longitudinal direction $D_L$ relative to the cargo area structure 12. The utility track 36 is installed to an inboard surface of the second side wall 24 and is basically identical to the utility track 36. Both the utility tracks 36 are a horizontally extending utility tracks.

As shown in FIGS. 1, 2 and 11-17, the basket 14 has a rectangular shaped frame structure 38 that is dimensioned to fit between the first side wall 22 and the second side wall 24 of the cargo area structure 12. The frame structure 38 of the basket includes an upper frame 42, a lower frame 44 and a plurality of vertical rails 46.

The vertical rails 46 extend between the upper frame 42 and the lower frame 44 and are spaced apart from one another. The vertical rails 46 are fixedly and non-movable attached to the upper frame 42 to the lower frame 44. More specifically, upper ends of the vertical rails 46 are welded or otherwise non-movably attached to the upper frame 42 and lower ends of the vertical rails 46 are welded or otherwise non-movably attached to the lower frame 44.

The lower frame 44 includes laterally extending braces 48 (perpendicular to the vehicle longitudinal direction $D_L$) and braces 50 that extend parallel to the vehicle longitudinal direction $D_L$, as shown in FIGS. 11-12 and 16-17. A metal mesh floor panel 56 is welded to the lower frame 44 in a conventional manner and overlays the braces 48 and 50.

Figure 12:
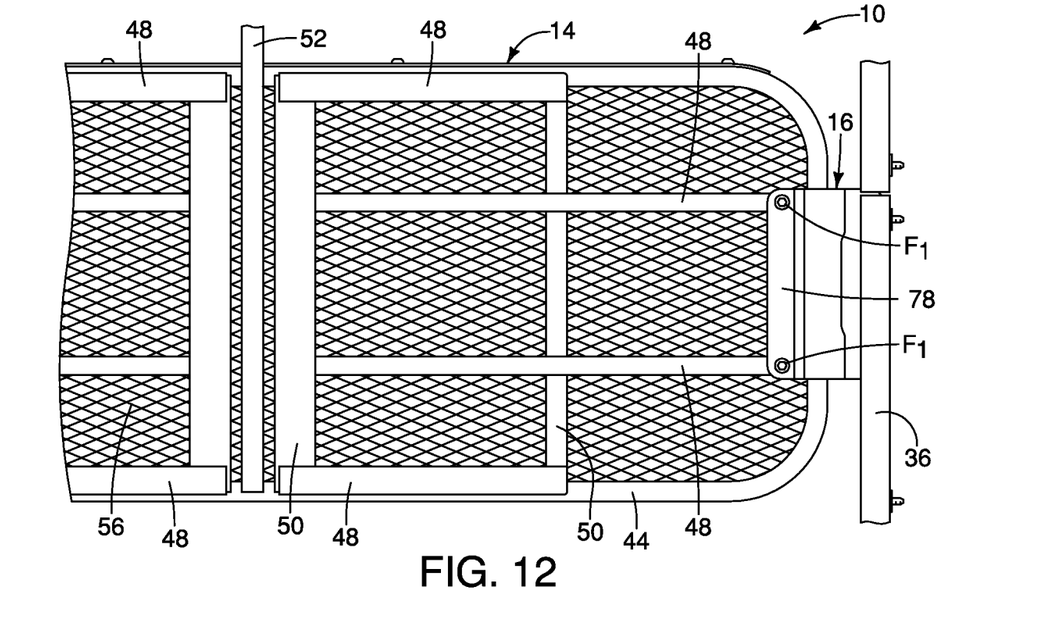
FIG. 12 is a bottom view of the basket showing the bracket attached to the underside of the basket and showing a towing hitch attachment in accordance with the first embodiment.
Figure 13:
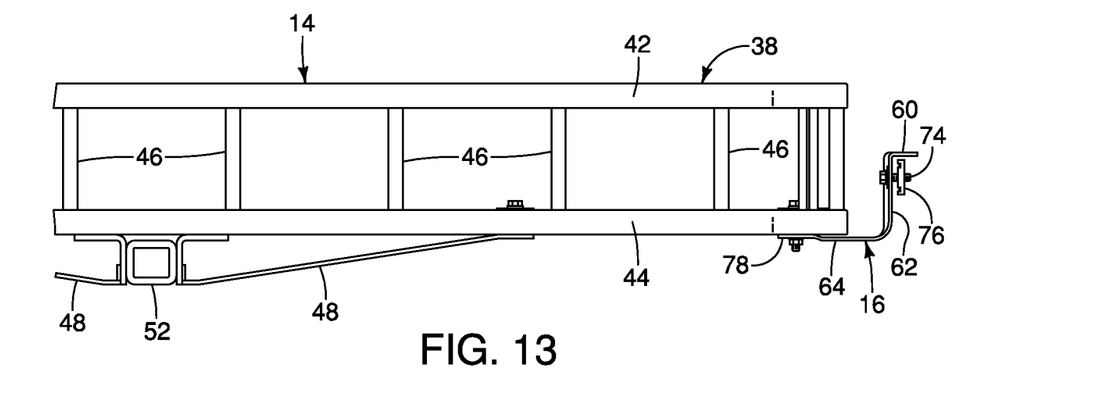
FIG. 13 is a rear view of the basket showing the bracket attached to the underside of the basket and showing the towing hitch attachment in accordance with the first embodiment.
Figure 14:
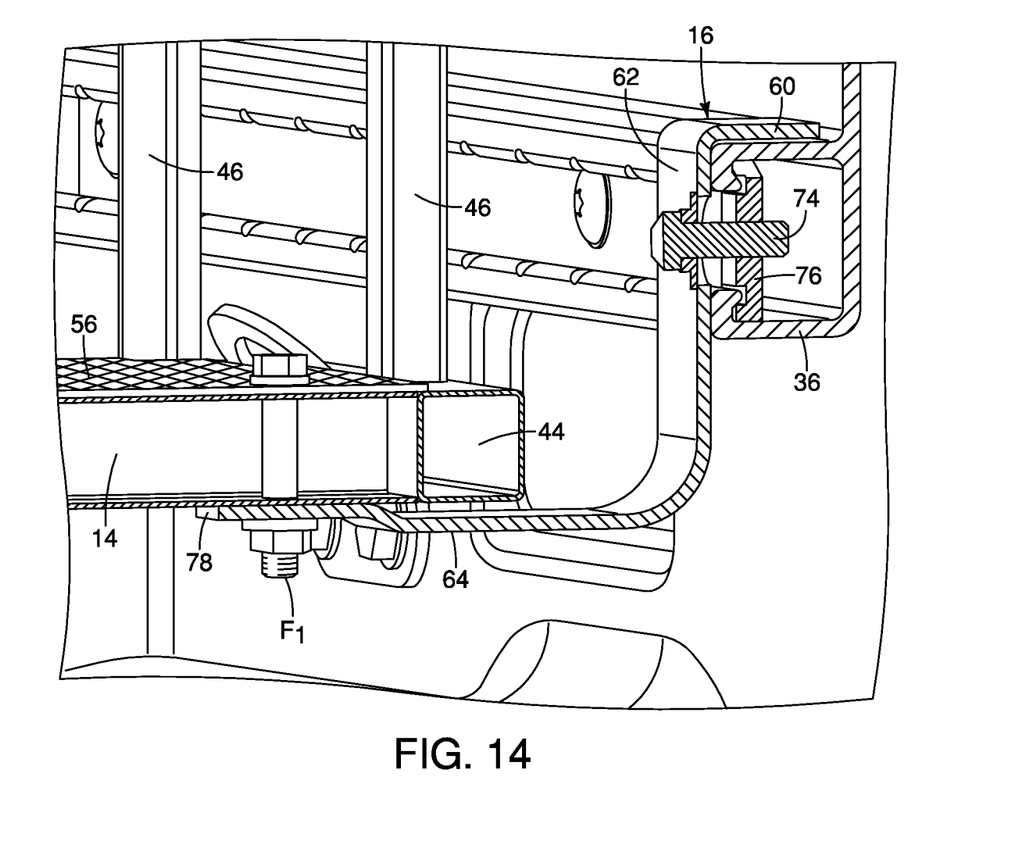
FIG. 14 is a perspective view of the basket showing the bracket attached to the utility track and to the basket in accordance with the first embodiment.
Figure 15:
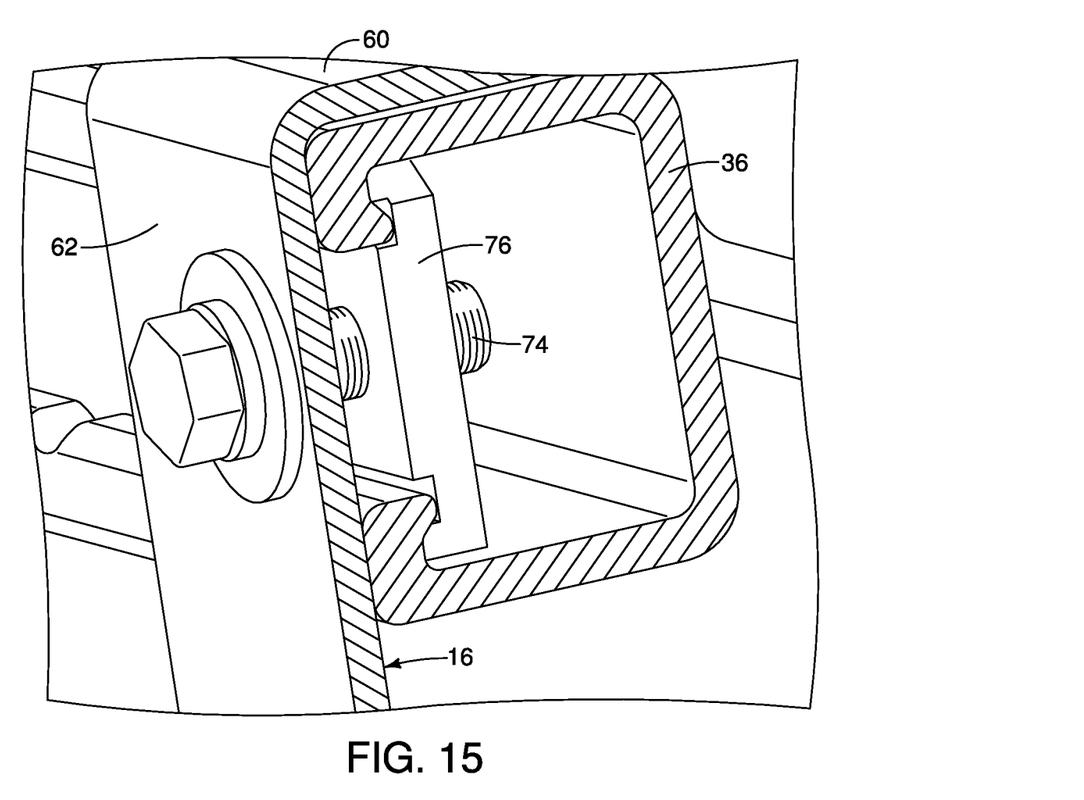
FIG. 15 is a perspective view of a portion of the side wall of the cargo area structure showing the bracket attached to the utility track in accordance with the first embodiment.
Figure 16:
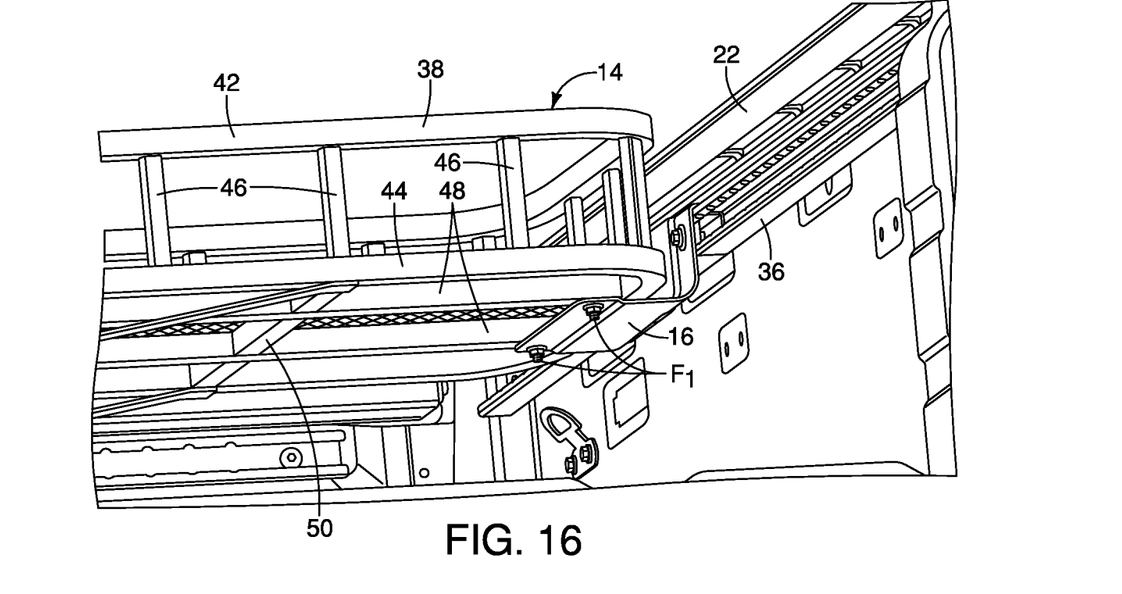
FIG. 16 is another perspective view of a portion of the side wall of the cargo area structure and basket showing the bracket attached to an underside of the basket and attached the utility track, with the bracket further being attached to the underside of the basket in accordance with the first embodiment.
Figure 17:
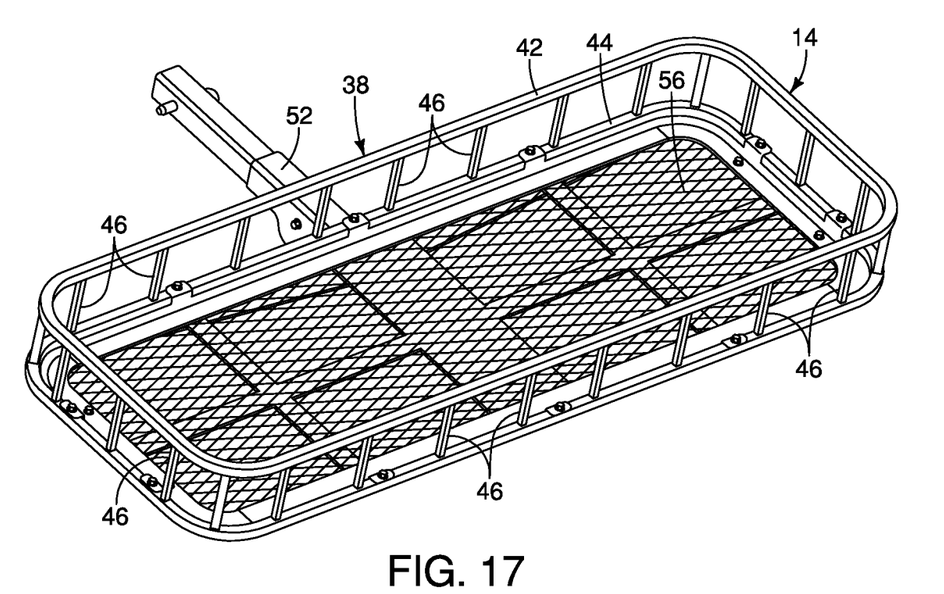
FIG. 17 is a perspective view of the basket shown removed from the cargo area structure and further showing the towing hitch attachment in accordance with the first embodiment.
Figure 18:
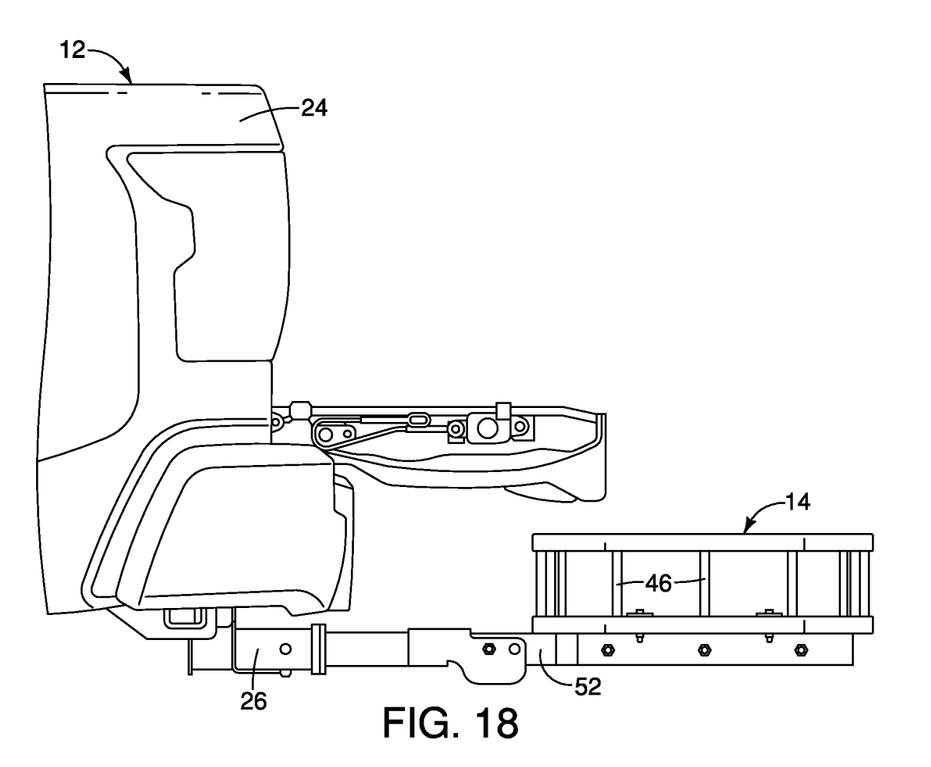
FIG. 18 is a side view of the basket shown removed from the cargo area structure and further showing the towing hitch attachment fixing the basket to the trailer hitch of the cargo area structure in accordance with the first embodiment.

The basket 14 further includes a towing hitch attachment 52 dimensioned and shaped to install to the towing hitch 26 (also referred to as a towing hitch assembly), as shown in FIGS. 1, 12 and 18.

Figure 19:
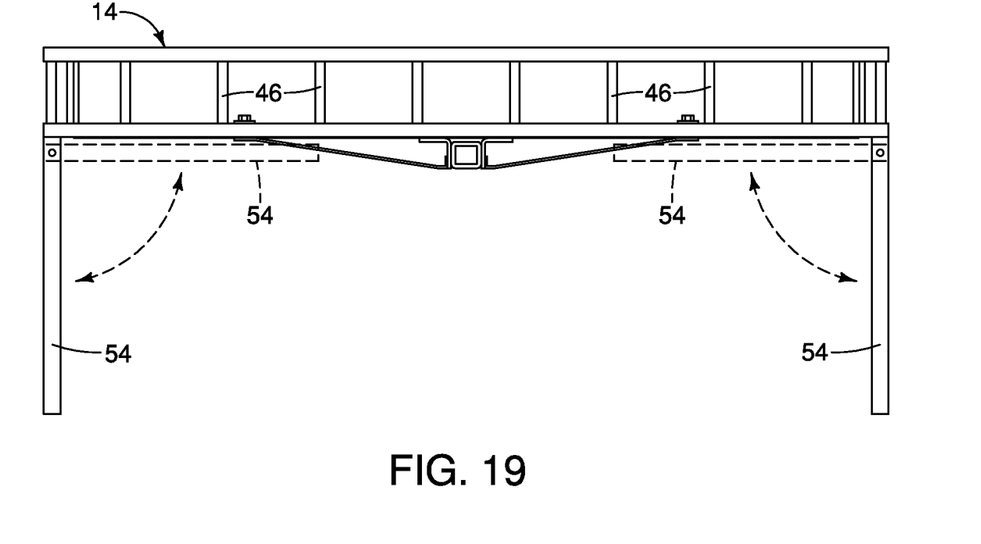
FIG. 19 is a side view of the basket shown removed from the cargo area structure with optional legs pivoted to an vertical orientation such that the basket is useable as a table or workbench in accordance with the first embodiment.

Optionally, as shown in FIG. 19, the basket 14 can include folding legs 54 movable between a retracted orientation (shown in phantom lines) and an extended orientation (solid lines) such that with the extended orientation the folding legs 54 are configured and dimensioned to support the basket.

A description of the bracket 16 is now provided with initial reference to FIGS. 2-11. There are two brackets 16 that are basically identical to one another. One of the brackets 16 is installed to the utility track 36 on the right side of the cargo area structure 12 (the right side of FIG. 1) and the other of the brackets 16 is installed to the utility track 36 on the left side of the cargo area structure 12 (the left side of FIG. 1). The brackets 16 extend under opposite lateral ends of the basket 14 and are attached thereto as described in greater detail below. Since the brackets 16 are basically identical to one another (but located on opposite sides of the basket 14), description of one of the brackets 16 applies equally to the other of the brackets 16. Therefore, for the sake of brevity, only one of the brackets 16 is described herein below.

The bracket 16 includes a first horizontal portion 60, a vertical portion 62 and a second horizontal portion 64 that are unitarily formed from a single metal sheet that is deformed to provide the bracket 16 with the features described herein. The first horizontal portion 60 includes a flat portion 60a on an upper surface utility track 36, as depicted in the FIGS. 2, 15 and 16. Alternatively (not shown), the first horizontal portion 60 can be dimensioned to rest atop one of the side walls 22 and 24 of the cargo area structure 12.

The vertical portion 62 has a first upright portion 66, a second upright portion 68 and a central vertical rib 70 between the first and second upright portions 66 and 68. The central vertical rib 70 is horizontally offset from first and second upright sides 66 and 68 of the vertical portion 62. More specifically, the central vertical rib 70 is shaped to be inboard of the first and second upright sides 66 and 68 of the vertical portion 62. As shown in FIGS. 2-4, 11 and 13-16, the vertical portion 62 further includes attachment structures 74 and 76 dimensioned and shaped to attach to the utility track 36 of a corresponding one of the side walls 22 and 24 of the cargo area structure 12. The second horizontal portion 64 has a basket attachment 78 dimensioned and shaped to support a corresponding lateral side of the basket 14. The basket attachment 78 is vertically offset from the remainder of the second horizontal portion 64. Specifically, the basket attachment 78 is vertically higher than the remainder of the second horizontal portion 64.

The attachment structure 74 is a fastener that is threaded into a clamping block 76. As shown in FIGS. 2-4, 11 and 13-16, the clamping block 76 (also referred to as a clamping element 76) is dimensioned to fit within the utility track 36. With the fastener 74 tightened to the clamping block 76, the bracket 16 is locked into position relative to the utility track 36. The basket attachment 78 of the second horizontal portion 64 of the bracket 16 includes fastener receiving openings with fasteners $F_1$ that attach to an underside of the frame structure 38 of the basket 14, as shown in FIGS. 2-3, 11-14 and 16.

As is demonstrated in FIG. 1, the basket 14 can be removed from the cargo area structure 12 and installed to the trailer hitch 26, providing an alternative way of using the basket 14. Further, as shown in FIG. 19, the basket 14 can be removed from the cargo area structure 12 and the folding legs 54 extended such that the basket 14 can be used as a table or workbench.

Second Embodiment

Figure 20:
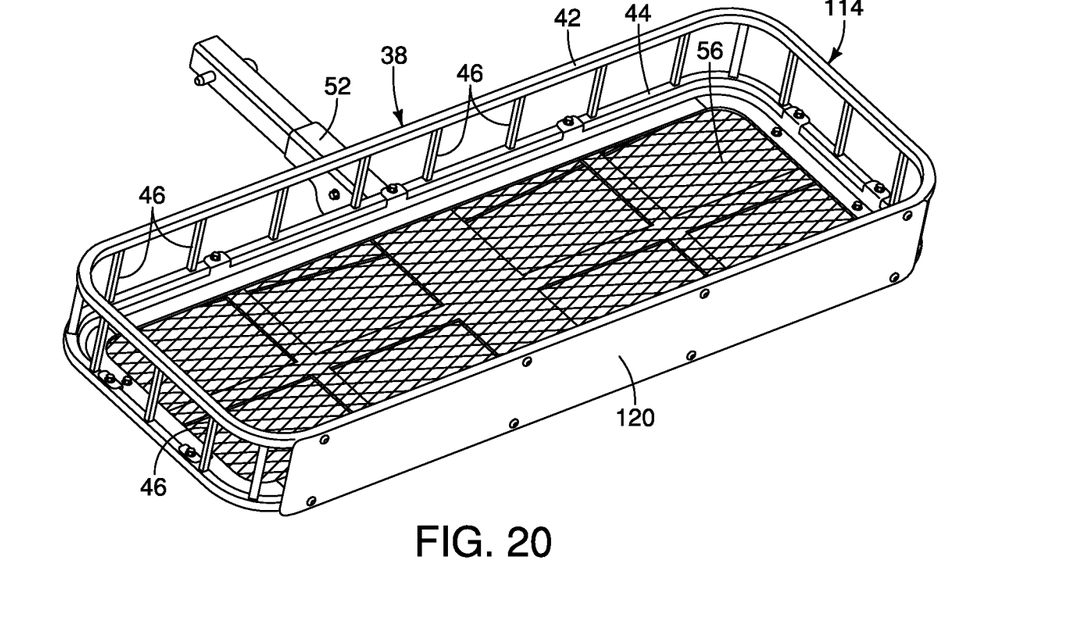
FIG. 20 is a perspective view of the basket shown removed from the cargo area structure and further showing a rear panel fixedly attached to the frame structure of the basket in accordance with a second embodiment.

Referring now to FIG. 20, a basket 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The basket 114 is identical to the basket 14 of the first embodiment, except that a panel 120 has been fixedly attached to a rear end of the frame structure 38. Specifically, the panel 120 is fixed to both the upper frame 42 and the lower frame 44. The panel 120 can be dimensioned to provide reinforcement to the basket 114 and/or can also be used for inclusion of a logo or other display.

Various structures and features of the cargo area structure 12 that have not been described herein are conventional components that are well known in the art. Since these structures and features are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the cargo area accessory structure. Accordingly, these terms, as utilized to describe the present invention should be interpreted relative to a vehicle equipped with the cargo area accessory structure.

The term "configured" as used herein to describe a component, section or part of the above described structures that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A cargo area accessory structure, comprising
a basket having a frame structure dimensioned to fit between side walls of a cargo area structure; and
a bracket having a first horizontal portion, a vertical portion and a second horizontal portion, the first horizontal portion including a flat portion dimensioned to rest atop a portion of one of the side walls of the cargo area structure, the vertical portion having a first upright portion, a second upright portion and a central vertical rib between the first and second upright portions, the central vertical rib being horizontally offset from first and second upright sides of the vertical portion, the vertical portion further including attachment structures dimensioned and shaped to attach to the one of the side walls of the cargo area structure, and the second horizontal portion having a basket attachment dimensioned and shaped to support one lateral side of the basket.

2. The cargo area accessory structure according to claim 1, wherein
the attachment structures of the vertical portion include clamping elements dimensioned to fit within a utility track fixed to the one of the side walls of the cargo area structure.

3. The cargo area accessory structure according to claim 1, wherein
the first horizontal portion of the bracket rests upon an upper surface of the utility track.

4. The cargo area accessory structure according to claim 1, wherein
the second horizontal portion includes fastener receiving openings with fasteners that attach to an underside of the frame structure of the basket.

5. The cargo area accessory structure according to claim 1, wherein
the frame structure of the basket includes an upper frame and a lower frame with vertical rails extending therebetween fixedly and non-removably attaching the upper frame to the lower frame.

6. The cargo area accessory structure according to claim 5, wherein
the vertical rails are welded to the upper frame and lower frame.

7. The cargo area accessory structure according to claim 5, wherein
the lower frame of the basket includes folding legs movable between a retracted orientation and an extended orientation such that with the extended orientation the folding legs are configured and dimensioned to support the basket.

8. The cargo area accessory structure according to claim 5, wherein
the lower frame of the basket includes a towing hitch attachment dimensioned and shaped to install to a towing hitch assembly of a motorized vehicle.

9. The cargo area accessory structure according to claim 1, wherein
a second bracket having a first horizontal portion, a vertical portion and a second horizontal portion, the first horizontal portion of the second bracket including a flat portion dimensioned to rest atop a portion of a second one of the side walls of the cargo area structure, the vertical portion of the second bracket having a first upright portion, a second upright portion and a central vertical rib between the first and second upright portions, the central vertical rib of the second bracket being horizontally offset from first and second upright sides of the vertical portion of the second bracket, the vertical portion of the second bracket further including attachment structures dimensioned and shaped to attach to the one of the side walls of the cargo area structure, and the second horizontal portion of the second bracket having a basket attachment dimensioned and shaped to support another lateral side of the basket.

10. A cargo area accessory structure, comprising
a vehicle that includes a cargo area structure having two opposing side walls;
a basket having a frame structure dimensioned to fit between the side walls of the cargo area structure; and
a bracket having a first horizontal portion, a vertical portion and a second horizontal portion, the first horizontal portion including a flat portion dimensioned to rest atop a portion of one of the side walls of the cargo area structure, the vertical portion having a first upright portion, a second upright portion and a central vertical rib between the first and second upright portions, the central vertical rib being horizontally offset from first and second upright sides of the vertical portion, the vertical portion further including attachment structures dimensioned and shaped to attach to the second one of the side walls of the cargo area structure, and the second horizontal portion having a basket attachment dimensioned and shaped to support one lateral side of the basket.

11. The cargo area accessory structure according to claim 10, wherein
each of the side walls of the cargo area structure includes a horizontally extending utility track.

12. The cargo area accessory structure according to claim 10, wherein
the first horizontal portion of the bracket rests upon an upper surface of the utility track with the first horizontal portion of the bracket resting atop the utility track.

13. The cargo area accessory structure according to claim 12, wherein
the attachment structures of the vertical portion include clamping elements dimensioned to fit within the utility track fixed of the one of the side walls of the cargo area structure.

14. The cargo area accessory structure according to claim 10, wherein
the second horizontal portion includes fastener receiving openings with fasteners that attach to an underside of the frame structure of the basket.

15. The cargo area accessory structure according to claim 10, wherein
the frame structure of the basket includes an upper frame and a lower frame with vertical rails extending therebetween fixedly and non-removably attaching the upper frame to the lower frame.

16. The cargo area accessory structure according to claim 15, wherein
the vertical rails are welded to the upper frame and lower frame.

17. The cargo area accessory structure according to claim 15, wherein
the lower frame of the basket includes folding legs movable between a retracted orientation and an extended orientation such that with the extended orientation the folding legs are configured and dimensioned to support the basket.

18. The cargo area accessory structure according to claim 15, wherein
the lower frame of the basket includes a towing hitch attachment dimensioned and shaped to install to a towing hitch assembly of a motorized vehicle.

19. The cargo area accessory structure according to claim 18, wherein
the lower frame of the basket includes folding legs movable between a retracted orientation and an extended orientation such that with the extended orientation the folding legs are configured and dimensioned to support the basket.

20. The cargo area accessory structure according to claim 10, wherein
a second bracket having a first horizontal portion, a vertical portion and a second horizontal portion, the first horizontal portion of the second bracket including a flat portion dimensioned to rest atop a second one of the side walls of the cargo area structure, the vertical portion of the second bracket having a first upright portion, a second upright portion and a central vertical rib between the first and second upright portions, the central vertical rib of the second bracket being horizontally offset from first and second upright sides of the vertical portion of the second bracket, the vertical portion of the second bracket further including attachment structures dimensioned and shaped to attach to the second one of the side walls of the cargo area structure, and the second horizontal portion of the second bracket having a basket attachment dimensioned and shaped to support another lateral side of the basket.

* * * * *